United States Patent [19]
Salajczyk

[11] 3,872,690
[45] Mar. 25, 1975

[54] UNIVERSAL TYPE SPINDLE COUPLING
[75] Inventor: Jan Salajczyk, Bytom, Poland
[73] Assignee: Huta "Zygmunt", Bytom, Poland
[22] Filed: June 26, 1973
[21] Appl. No.: 373,798

[30] Foreign Application Priority Data
July 5, 1972 Poland .............................. 156502

[52] U.S. Cl. ............................ 64/9 R, 64/7, 64/8, 403/58
[51] Int. Cl. ............................................ F16d 3/18
[58] Field of Search ............ 64/9, 6, 4, 8, 7, 14, 17; 403/57, 58 X

[56] References Cited
UNITED STATES PATENTS
1,300,541  4/1919  Wolffgram ........................ 64/9 R
3,339,379  9/1967  Snyder ................................ 64/7
3,381,497  5/1968  Allen .................................. 64/8
3,611,749  10/1971  Kesperczyk et al. ............. 64/8

FOREIGN PATENTS OR APPLICATIONS
1,012,782  7/1957  Germany ............................ 64/9

Primary Examiner—Benjamin W. Wyche
Assistant Examiner—Randall Heald
Attorney, Agent, or Firm—Eric P. Schellin

[57] ABSTRACT

The invention relates to an articulated coupling spindle especially for use in rolling mills. It is for transmitting the torque between two shafts arranged not coaxially.

It is appropriated for transmission of high torques at relatively small rotational speeds.

7 Claims, 2 Drawing Figures

UNIVERSAL TYPE SPINDLE COUPLING

The object of the invention is an increase of the life of articulated joints, especially of mill joints.

The task according to the invention is solved through application of a pair of articulated joint heads, in which the longitudinal axis of at least one of the heads is transversely not fixed with bearings, whereby each head has on its end three carrying arms which couple both heads in their rotational movement over six inserts. The simultaneous work of three arms in the articulated joints makes the coupling spindle able to transmit the torque considerably higher than in known coupling spindles. The play-free or almost play-free arrangement works much better to help secure the coupling-spindle against the destructive action of the dynamic forces, even at highest of deflection angles being employed. The synchronous or inappreciably asynchronous transmitting the rotations through the articulated joints of the coupling spindle, eliminating or smoothing, in comparison with known coupling spindles, the differences of angular speed, improves also the life of the articulated joints.

BACKGROUND OF THE INVENTION

The invention relates to an articulated universal type spindle coupling especially for use in rolling mills, provided with working inserts having a shape of spherical segments, appropriate for transmitting the torque between two shafts which are not coaxially arranged, which position during the work is adjustable within some limits, or permanent. Said coupling spindle is appropriated for transmission of high torques at relatively small rotational speeds, which may accordingly increase with the decrease of its deflection angle, and especially is appropriated for driving rolls of relatively slow-speed metalurgical mills.

For transmission of the torque in mills, various prior art coupling spindles of different types previously have been employed, terminate in complemental articulated heads, one spindle of which co-operates with the head forming the end of the driving shaft, the other with the head forming the beginning of the driven shaft. In such prior art universal type couplings a pair of heads co-operates, directly or by means of differently shaped segments, one of which heads is designated the outer head, and the second head is called the inner head. The one head of the pair is not-rotatively coupled with the coupling spindle, or forms its integral part, the other however is not-rotatively coupled with the driving shaft, or with the driven one, or constitutes an integral part either one of them. The know coupling spindle is with its heads supported on the heads of the driving and the driven shafts, but sometimes is also supported with one or two bearings, when its weight is to be balanced. There also are known articulated coupling spindles in which the outer head, which is bifurcated into two parallel arms, is coupled by means of two pairs of inserts having the form of spherical segments, hereinafter called inserts, with the inner head terminated with flattenness frequently named shovel. Both pairs of inserts are with their spherical surfaces placed on inner spherical surfaces having two different centres lying on the axis of the articulated joint and connected permanently with the outer head with their flat surface they contact slidably with the shovel. Said inserts being seated in spherical seats can rotate in all directions, thus being self-aligning. Both heads of the articulated joint can rotate against each other in one plane, on the above inserts as in bushings. In the second plane perpendicular to the first, the heads can rotate on the spherical bearing, the bearing shell of which is layed over the pin fastened in the arms of the fork, the outer housing being seated in the shovel. The displacement angles in said coupling spindles reach the value up to 10°. The disadvantage of the prior art coupling spindle described above is the lack of ability to transmit higher torques, and thereby highly inequal, as to the height of stresses, use of the cross sections of the fork at the base of their arms, which tend to fail at these places. Further disadvantage of the described coupling spindle is also an asynchronousness inherent to the structure of the articulated joints. Even at constant speed of the driving shaft the spindle is submitted to permanent angular accelerations, both positive and negative ones, what taking into account its considerable inertia causes subsequently the appearance of additional dynamical loadings of the system, reducing somewhat the life of elements lying also besides the joints themselves.

There are also previously known articulated coupling joints in which the outer head, having the form of a thick-walled cylinder opened from one side, is coupled with the square end of the inner head over four pairs of spherical inserts. Said pairs of inserts located in inner spherical surfaces having four different centres arranged symmetrically around the longitudinal axis of the outer head inside its cylindrical portion, enclose slidably the longitudinal corners of the inner head end. The torque of determined direction is by this articulated joint transmitted permanently only through two opposite among four inserts appropriated for this purpose, both inserts being subsequently carried into determined areas of the rotation angle of the joint, where they carry the load, which is subsequently transmitted to the remaining oppositely positioned inserts as they themselves leave said areas. Only at boundaries of said areas four inserts work simultaneously. Said coupling spindle shows a series of disadvantages. For to work with displacement it needs considerable preliminary plays, due to the variation of the distance between the flat surfaces of the inserts at displacement of the spindle from the drive axis. The loading of the insert and of adjacent arms of the pair of heads, appropriated for operation in given direction, changes two times in the course of one revolution of the joint, from zero to its maximum value. This results in a dynamic characteristic of the work of the spindle articulated joints, even at constant value of the torque being transmitted, and stipulates rapid material fatigue. Said coupling spindle is not able to transmit higher torques as only two inserts work continuously, and its articulated joints are also characterized by asynchronousness. Owing to the tolerance or clearance plays already mentioned and dynamic operational characteristic, said coupling spindle shows a relatively small deflection angle.

The disadvantages of the aforementioned coupling spindles reduce their life. Oten replacing of worn members of the articulated joints reduces the productivity of the mill. An example of such a prior coupling device may be found in U.S. Pat. No. 3,611,749.

The object of the present invention is an increase of the life of articulated joints, especially of mill universal type joints. In order to achieve said objects, an improved design of the articulated joints of the coupling spindle is to be provided, which secures a much higher ability for transmitting the torques within the range of relatively low rotational speeds, and hitherto employed values of the deflection angles, while simultaneously avoiding large tolerances or plays and with improvement of the transmission of angular speeds in articulated joints.

SUMMARY OF THE INVENTION

In the articulated joint of the coupling spindle according to the invention the task is solved through application of a pair of articulated joint heads, in which the longitudinal axis of at least one of this heads, is tranversely not fixed with bearings, whereby each head has on its end three carrying arms which couple both heads in their rotational movement by means of 3 pairs of inserts. The pairs of said inserts are placed with their convex surfaces in inner spherical surfaces of the arms of outer head, and slidably enclose flat surfaces of the arms of the inner head with their corresponding flat surfaces. The outer head in its three carrying arms, is provided with inner spherical surfaces, carrying the loads from the torque, having three different centres connected with the head immovably during the operation, which are arranged around the longitudinal axis of this head in such way that they can be regarded as vertexes of preferably an equilateral triangle, which area is punctured by said axis. This outer head has a recess in its front, suitable to complementally receive the arms of the inner head. The latter arms are connected with the inner spherical surfaces of its carrying arms, or extended still further to their outer circumference, dividing the outer head distinctly into three arms. The inner head has, on each of its three carrying arms, flat working surfaces to receive the driving torque. The arrangement and form of the arms of inner head are such that the planes tangential to the flat working surfaces lying on the same corresponding sides of its three arms form a triangular prism, preferably an equilateral or regular one, which centrally enclose the longitudinal axis of this head therein. Both flat carrying surfaces of each head arm may be inclined to each other, but mot preferably they are parallel to each other.

The specified technical means constituting the structure of the articulated coupling spindle solve completely the technical task being established. The deflection of one head of the articulated joint against the other by a certain angle about the fixed centre of the articulated joint is accompanied by automatic self-aligning of the inserts, and relative transverse displacement of the longitudinal axes of the heads from this centre in certain directions by a small value, whereby slips occur simultaneously on flat and spherical surfaces of all the inserts, correlated with corresponding shaped surfaces of the arms of both heads. If one of the heads has its axis fixed transversely, the other head, with its axis being not fixed by bearings, is submitted to the transverse displacement, whereby said axis, during the rotation of the articulated joint, describes some generally orbital path or surface in the ambient space, depending on the dimensions and correlation of two articulated joints of the coupling spindle, and further depending on the position of the driving shaft and the driven shaft against each other and against the coupling spindle. This transverse displacement of the head is possible, due to the fact that its axis is not fixed, and a natural tendency of the system of three carrying arms of both heads, being coupled without or with minimum play, to such a displacing. The axis of the head being not transversely fixed is, of course coincident with the axis of the coupling spindle, the transverse displacement of which occurs about the straight line running through the centres of its both articulated joints. If the path or surface described by the axis of the coupling spindle is a cylinder, and can work without plays, whereby even low torque is in each of them transmitted simultaneously by three arms. In remaining cases, when the said path or surface is not a cylinder, the initially low torque is transmitted in each articulated joint by two arms subsequently, and from the theoretical point of view it is necessary to provide some preliminary play to the articulated joint. Within employed sizes and deflection angles of the coupling spindle said play is so inappreciable that even a torque of middle value causes, through small elastic deformation, the engaging of remaining arms in the articulated joints, which in this case transmit the rotations with minimum asynchronousness. The dimension of said preliminary play depends on the sizes and deflection angles of the articulated joints, and on the distance between them, being reduced with the increase of the last. The axis of the coupling spindle is not its axis of rotation when working with deflection. The coupling spindle is then dynamically unbalanced and is submitted to the action of the centrifugal inertia forces. The value of said forces is insignificant in comparison with the loads which can be carried by the coupling spindle, first of all due to relatively low rotational speed for which the coupling spindle is appropriated. The simultaneous work of three arms in the articulated joints makes the coupling spindle able to transmit the torque considerably higher than in known coupling spindles. The play-free or almost play-free structural relationship assures that much the coupling spindle will not be subjected detrimentally to the destructive action of the dynamic forces, even at highest deflection angles being employed. The synchronous or inappreciably asynchronous transmitting the rotations through the articulated joints of the coupling spindle, eliminating or smoothing, in comparison with known coupling spindles, the differences of angular speeds, improves also the life of the articulated joints.

DETAILED DESCRIPTION OF PREFERRED EMBODIMENT

Figure 1:
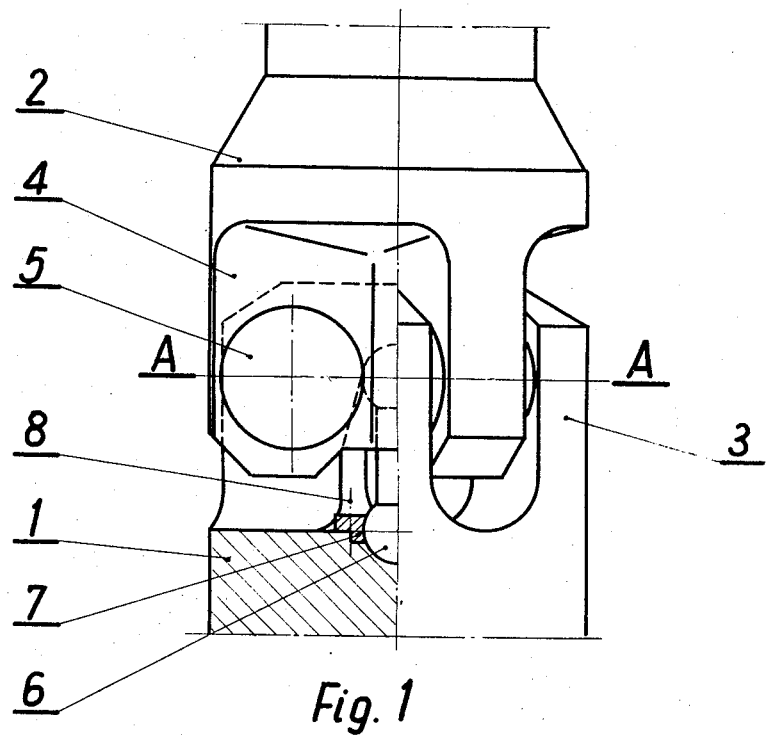
Figure 2:
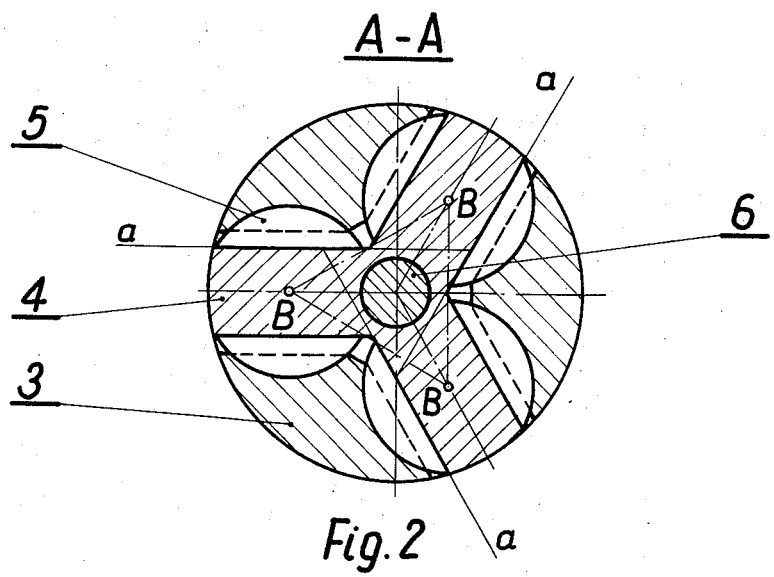

The invention will be now more particularly described by means of an exemplary embodiment with reference to the accompanying drawing in which:

FIG. 1 is the side half section of one of two articulated joints, in its not deflected position, and FIG. 2 is the cross-sectional view A—A of the same articulated joint.

As shown in FIGS. 1 and 2 the outer head 1 and the inner head 2, respectively mounted on ends of axially elongated spindle components, carry on their ends three carrying arms 3 and 4 each, which at rotation couple both heads 1 and 2 through six inserts 5, constituting three pairs thereof. The respective pairs of said inserts have their convex sides located in the corresponding inner spherical surfaces of the carrying arms 3 of the outer head 1, and have their flat surfaces complementally embracing each carrying arm 4 of the inner head 2. The outer head 1, in its three carrying arms 3, is provided with inner spherical surfaces having three separate centres "B" forming the vertexes of an equilateral triangle shown clearly in FIG. 2. The triangular area is centrally punctured by the longitudinal axis of this head. This outer head 1 has also in its front portion a recess extending beyond or through the spherical surfaces of the carrying arms 3 to its external circumference. The inner head 2 has on each carrying arm 4 two flat carrying surfaces parallel to each other.

The carrying arms 4 are arranged around the longitudinal axis of the related spindle and the inner head 2 in such way, that the planes "a" tangential to the flat carrying surfaces lying on the same corresponding sides of arms 4 form a regular or equilateral triangular prism having this axis passing through its center. The articulated joint is provided with a spherical connector 6, which by one end is articulately clamped by a split cover 7 and screws 8 so as to be centered on the axis of the outer head 1, and with its other end is freely placed in the conical opening terminated with a spherical seat, made in the axis of the inner head 2. The spherical connector 6 limits the mutual axial displacement of both heads 1 and 2 in one direction, maintaining the secure position of their carrying arms 3 and 4. In certain cases of employing the articulated joints of the coupling spindle it is preferable for the working surfaces of the carrying arms of both heads, or of one of them, be made on separate elements fastened then in these arms.

BRIEF REVIEW OF OPERATION

The operation of the articulated joint shown in the exemplary embodiment of the invention depends also on the other articulated joint (being not shown in the drawing). As mentioned hereinabove the axis of the coupling spindle, being not transversely fixed by bearing, describes in the ambient space, during its rotation with angular deflection about the straight line connecting the centres of the articulated joints, a surface depending on the size and correlation of two articulated joints of the coupling spindle, and further depending on the position of the driving and the driven shafts against each other and against the coupling spindle. If the shafts are parallel and connected with the coupling spindle by means of articulated joints having the same sizes with the same kind of heads on both its ends, then at conform situation of the arms on both these arms around the longitudinal axis of the coupling spindle, said axis describes three times the generating surface of a circular cylinder for one revolution of the driving shaft, whereby the articulated joints transmit the rotations synchronously, and can work-freely, transmitting the torque with all the arms simultaneously. At the position of the arms of both said heads, turned by an angle of 60°, however, said axis describes three times a generating surface of an almost circular cone with a vertex lying in the middle distance between the axes of the articulated joints, whereby each articulated joint transmits the rotations with a minimum asynchronousness and must dispose with a small operational play, transmitting low torques subsequently by two arms, and the middle ones — owing to elastic deformations — by the arms. The vertex of the mentioned cone is a suitable place for possible supporting of the coupling spindle at balancing its weight. When working with angular deflection the coupling spindle is not balanced dynamically.

The co-operation of the articulated joints of the coupling spindle in other cases as scheduled hereinabove their mutual correlation with each other and with the shafts may be identical as described, or similar, although the transversal movements of the longitudinal axis of the coupling spindle can be someways different, due to the centrifugal inertia forces and to the possibilities of to support it, and less advantageous as the named. The cause thereof is that said axis can describe surfaces between cylinder and cone, having small bases within the length of the coupling spindle, whereby the values of plays corresponding with individual cases rest within a narrow range.

What is claimed is:

1. In a synchronous universal-type rotatable spindle coupling embodying a pair of axially elongated articulated joint spindle components each having an axis and a joint coupling head 1,2 provided with a plurality of axially extending angularly spaced complementally interfitting arms 3, 4, said arms being universally coupled together in substantially a clearance-free manner by means of bearing inserts 5 interengaging respectively spaced apart radially juxtaposed surfaces of said interfitting arms, the improvement wherein:

at least one of said spindle components is mounted with at least part of its axial length and head free to move transversely of its axis and axial rotation when in operative use.

2. A universal-type coupling as defined in claim 1, wherein said spindle components are non-axially aligned and at least part of both of said joint spindle components and their respective heads are mounted with substantially no backlash clearance and so as to be able to move transversely of their axes.

3. A universal-type coupling as defined in claim 1, wherein said coupling heads each include a plurality of three of said arms; and three sets of complementally paired generally hemispherical-type bearing inserts are utilized therewith as stated.

4. A universal-type coupling as defined in claim 3, wherein:

said bearing inserts have flat surface portions opposite convex portions thereof;

said arms of one of said heads each having parallel opposed torque-receiving sides which constitute part of said radially juxtaposed surfaces and which are engageable by said flat-surfaced portions of the bearing inserts;

the arms of the other of said heads collectively having other faces in opposed relation to constitute other of said radially juxtaposed surfaces, between which said parallel opposed surfaces of said first-mentioned head arms are interfitted, said opposed other faces of the other head arms having complementally spherical recesses to respectively receive the hemispherical portions of said bearing inserts; and said spherical recesses and said hemispherical bearing inserts being of a large size to extend substantially fully between radially innermost and outermost extremeties or circumferences of said universally coupled arms.

5. A universal-type coupling as defined in claim 4, wherein said first-mentioned three arms with parallel opposed sides each have a centerpoint equidistantly spaced around the longitudinal axis of this head such that said center points can be regarded as vertexes of essentially an equilateral triangular area, and which area is intersected by said axis, and wherein planes passing tangentially to a common one of said parallel sides of each of said same three arms, collectively form essentially an equilateral triangular prism centrally enclosing said longitudinal axis.

6. A universal-type coupling as defined in claim 1, further including spherical headed link means interconnecting substantially axially opposed central portions of said respective coupling heads to limit potential axial separation thereof.

7. A universal-type coupling as defined in claim 5, further including spherical headed link means interconnecting substantially axially opposed central portions of said respective coupling heads to limit potential axial separation thereof.

* * * * *